Feb. 19, 1924.
C. C. FERGUSON
TANK GAUGE
Filed Oct. 20, 1919
1,483,968
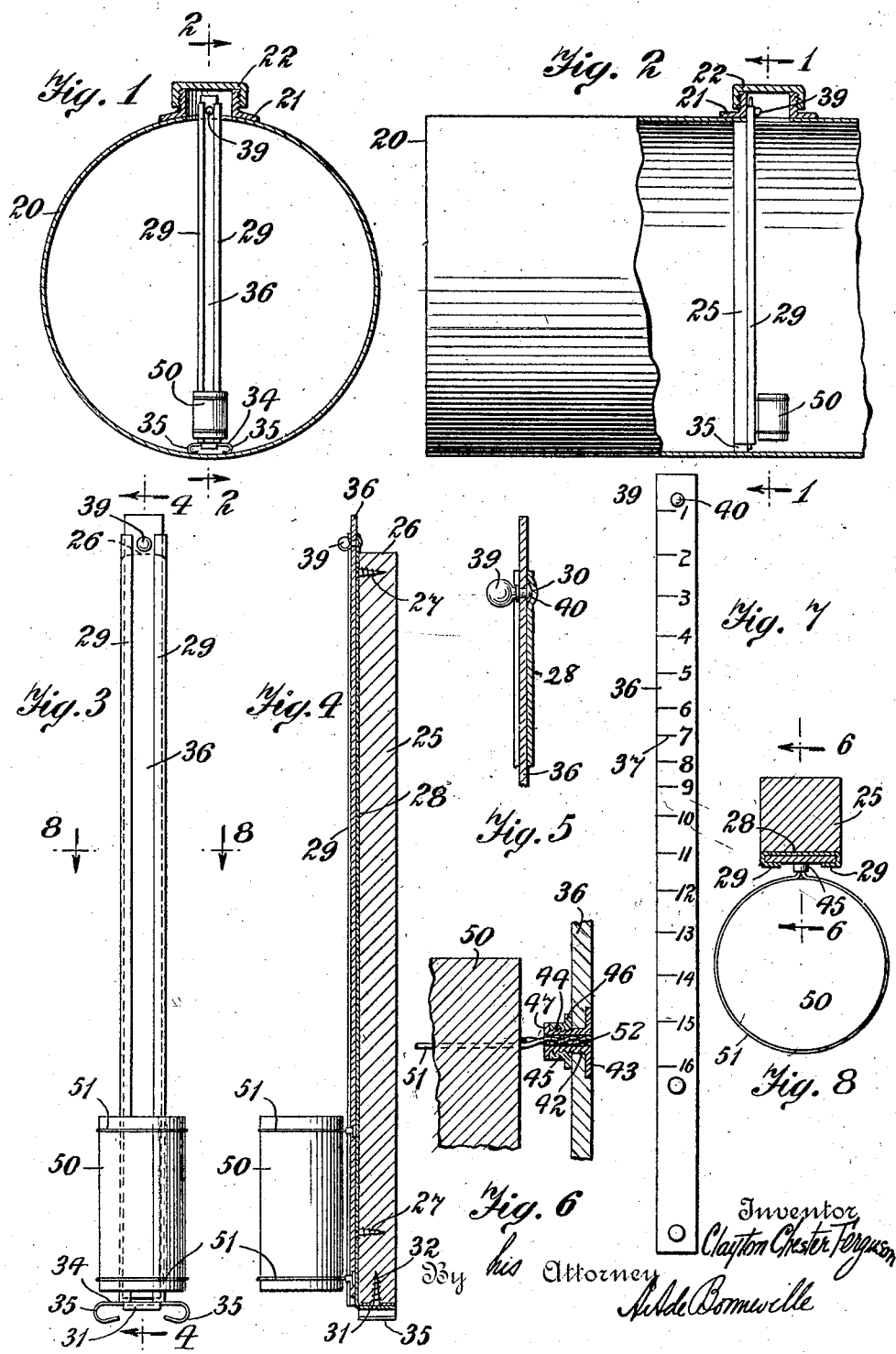

Patented Feb. 19, 1924.

1,483,968

UNITED STATES PATENT OFFICE.

CLAYTON CHESTER FERGUSON, OF JERSEY CITY, NEW JERSEY.

TANK GAUGE.

Application filed October 20, 1919. Serial No. 331,896.

*To all whom it may concern:*

Be it known that I, CLAYTON CHESTER FERGUSON, citizen of the United States, and resident of Jersey City, in the county of Hudson and State of New Jersey, have invented certain new and useful Improvements in a Tank Gauge, of which the following is a specification.

The object of this invention is the production of a simple and inexpensive tank gauge, by means of which the quantity of fluid in a tank, particularly an automobile gasoline tank, can easily be ascertained. It is so simple in construction that it can easily be installed by the user without resorting to the services of a skilled mechanic. Its organization comprises a column with a guide plate. A measuring rod with a float is slidably supported in the guide plate, and means are provided for locking the measuring rod to the guide plate. A spring foot at the bottom of the column allows the latter to be easily locked in position in a tank with a curved interior.

In the accompanying drawings which exemplify one of the forms of the improved gauge, Fig. 1 represents a front elevation of the gauge with a section of a tank as on the line 1, 1 of Fig. 2; Fig. 2 shows a side elevation of the gauge with a partial outside view of its tank and partial section as on the line 2, 2 of Fig. 1; Fig. 3 shows an enlarged front elevation of the gauge; Fig. 4 is a section of Fig. 3 on the line 4, 4; Fig. 5 represents an enlarged fragmentary portion of Fig. 4; Fig. 6 shows an enlarged section of Fig. 8 on the line 6, 6; Fig. 7 is an enlarged elevation of a measuring rod of the gauge and Fig. 8 shows an enlarged section of Fig. 3 on the line 8, 8.

The tank 20 shown in this instance with the gauge is cylindrical in cross-section, and has connected thereto a charging nozzle 21, with the threaded cap 22.

The gauge comprises the column 25 preferably of wood with the slightly curved upper end 26.

To the front face of the column 25 there is fastened by means of the screws 27 the guide plate 28 which is C-shaped in cross-section, having the retaining flanges 29 at its sides. A locking depression 30 is formed in the upper end of the guide plate 28, and the lower end of the said guide plate is bent or flanged as shown at 31 and secured to the lower end of the column 25 by means of the screw 32. Between the face of the bottom of the column 25 and the bent portion 31 there is secured by the said screw 32 the C-shaped spring foot 34 having the legs 35.

A measuring rod 36 having a scale 37 has secured to its upper end the knob 39 with the locking button 40, which latter registers with the locking depression 30 when the said measuring rod is in its lowest and locked position. The said measuring rod 36 is slidably supported in the guide 28. A sleeve 42 with the flange 43 and the exteriorly threaded end 44 is supported in the measuring rod 36. A nut 45 with the flange 46 is in threaded engagement with the threaded end 44. The flange 46 bears against the front face of the measuring rod 36. The outer end 47 of the sleeve 42 is spun over the outer edge of the nut 45, and thereby said nut and sleeve are securely fastened to the measuring rod 36. A float 50, shown in this instance of solid material like cork, has tightly wound around its surface the pair of wires 51, the ends 52 of which are twisted one around the other and then inserted in the sleeve 42 where they are secured by means of solder.

To install the gauge in place the cap 22 of the tank 20 is removed, and the gauge is placed in the tank with the legs 35 of the spring foot 34 bearing on the bottom of the tank. The curved upper end 26 of the column 25 is brought under the roof of the tank and bears up against the same.

The back face of the guide plate 28 is next preferably brought to bear against the inner face of the nozzle 21, and may be soldered thereto.

To use the gauge the measuring rod 36 is unlocked from the guide plate 28, by unlocking the locking button 40 from the locking depression 30. The button 40 can be unlocked by bearing on the end 26 of the column 25 and pulling up the measuring rod 36, by means of the knob 39. The flexibility of the guide plate 28 at the depression 30 will permit the button 40 to disengage from the depression 30. The float 50 will then carry the measuring rod 36 to its proper level to indicate the quantity of fluid or gasoline in the tank by means of the scale 37. The scale will differ with different forms and dimensions of tanks, and the graduations of the scale can easily be marked thereon by filling the tank with a vessel of known capacity and marking the graduation on the scale as the float 50 carries the measuring rod 36 to different levels. It will be noted that the tank can be charged with fluid through the nozzle 21 without dislocating the gauge.

Having described my invention what I desire to secure by Letters Patent and claim is:

1. In a tank fluid measuring gauge the combination of a column, a flexible medium at one end of the column, to adapt the column to be locked with the opposed walls of the tank, a measuring rod slidably supported on the column, a float for the rod and means to attach it thereto.

2. In a tank fluid measuring gauge the combination of a column, a spring foot coacting with the column to lock the column in the tank, a measuring rod slidably supported on the column, a float for the rod and means to attach it thereto.

3. In a tank fluid measuring gauge the combination of a column adapted to bear on the opposed walls of a tank to lock it in place therein, a pliable foot for the column, a measuring rod slidably coacting with the column and a float attached to said rod.

4. In a tank fluid measuring gauge the combination of a column, a spring foot extending from the lower end of the column adapted to bear on one of the opposed walls of the tank and thereby lock the column in place with its other end bearing against the other opposed wall of the tank, a measuring rod slidably coacting with the column, a float attached to the rod and means to lock the measuring rod in position.

5. In a tank fluid measuring gauge the combination of a column, a spring foot secured to the lower end of the column, a guide plate fastened to the column, a measuring rod slidably supported in the guide, a float carried by the measuring rod and means to lock the rod to said guide.

6. In a tank fluid measuring gauge the combination of a column, a spring foot secured to the lower end of the column, a guide plate having retaining flanges at its sides and a locking depression formed therein fastened to the column, a measuring rod with a scale thereon slidably supported in the guide, a float fastened to the measuring rod, and a locking button carried on the measuring rod adapted to lock with the locking depression of the guide plate.

7. In a tank fluid measuring gauge the combination of a column, a spring foot for the column, a guide plate fastened to the column, a measuring rod slidably supported in the guide plate, a float for the measuring rod, a sleeve with a flange at one end and exteriorly threaded at the other end supported in the rod, a nut in threaded engagement with the sleeve with the bottom face thereof bearing against the front face of the measuring rod, the outer end of the sleeve spun over said nut and a wire clamping said float, with its end secured in the sleeve.

8. In combination, a tank having a charging opening for a fluid, a detachable fluid measuring gauge in the tank, a column for the gauge having a curved upper end, a spring foot for the gauge, the upper end of the column bearing against the roof of the tank and the bottom bearing against the bottom thereof, a measuring rod slidably coacting with said column and a float fastened to the measuring rod.

9. In combination, a tank for a fluid having a charging opening, a charging nozzle over said opening, a detachable fluid measuring gauge in the tank, a column for gauge, a pliable medium extending from the foot of the column, said medium bearing on the bottom of the tank and conforming to the contour thereof, the top of the column bearing up against the crown of the tank adjacent to the opening therein, a guide plate fastened to said column with its upper end extending into said nozzle, a measuring rod slidably supported in the guide plate, a float fastened to the measuring rod at the lower end thereof and means to lock the measuring rod to the guide plate.

Signed at the borough of Manhattan, city of New York, in the county of New York and State of New York, this 15th day of October, A. D. 1919.

CLAYTON CHESTER FERGUSON.